Dec. 25, 1945. C. F. MARSCHNER ET AL 2,391,432
PROCESS OF MANUFACTURING MOLDED PLASTIC DIE MEMBERS
WITH ELECTRIC HEATING ELEMENTS EMBODIED THEREIN
Filed May 8, 1943 2 Sheets-Sheet 1

INVENTORS:
Charles F. Marschner and
Edward W. Bryan,
by Cam Hau & Gravely,
THEIR ATTORNEYS.

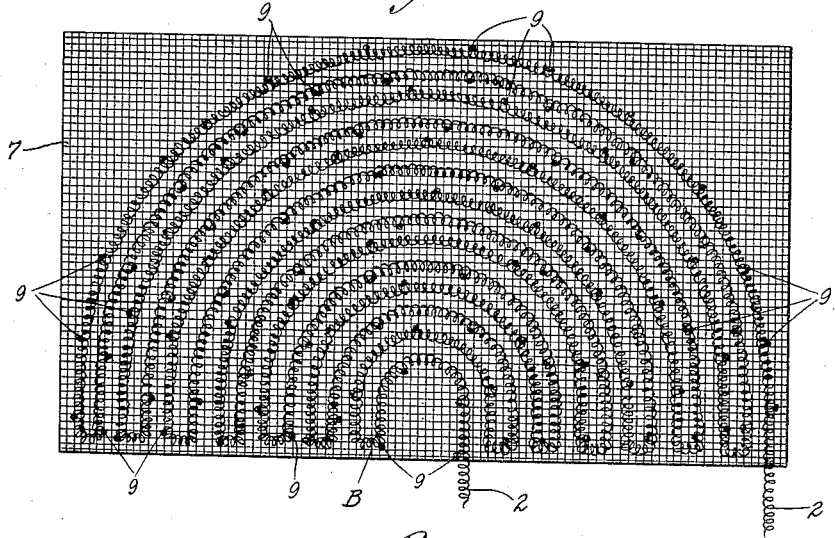
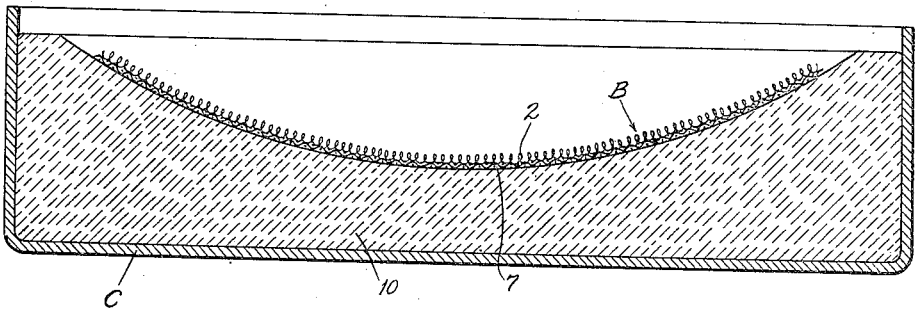
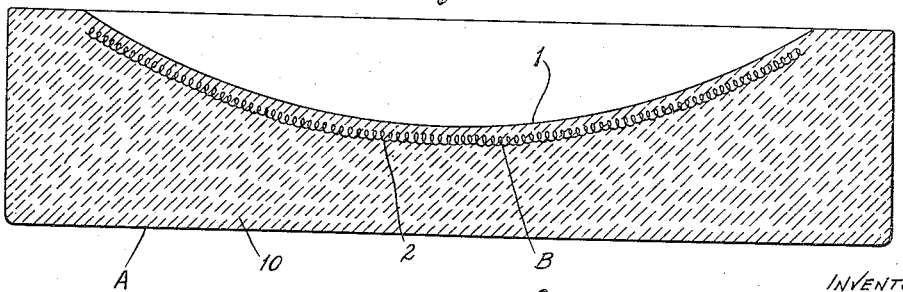

Patented Dec. 25, 1945

2,391,432

UNITED STATES PATENT OFFICE 2,391,432

PROCESS OF MANUFACTURING MOLDED PLASTIC DIE MEMBERS WITH ELECTRIC HEATING ELEMENTS EMBODIED THEREIN

Charles F. Marschner, Normandy, Mo., and Edward W. Bryan, Arcadia, Calif., assignors to McDonnell Aircraft Corporation, St. Louis, Mo., a corporation of Maryland Application May 8, 1943, Serial No. 486,268

5 Claims. (Cl. 219—19)

This invention relates to molded plastic die members of the type having electric heating elements embodied therein. The principal object of the invention is to devise a simple and economical process of manufacture by which the heating element may be quickly and easily formed in a predetermined pattern and readily embodied in the die during the molding or casting thereof. The invention consists in the process hereinafter set forth and claimed.

Figure 1:
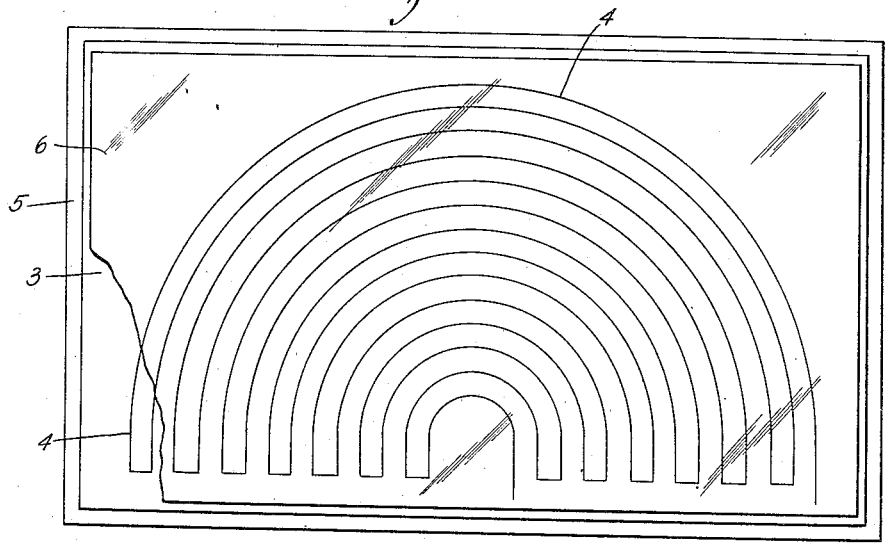
Figure 2:
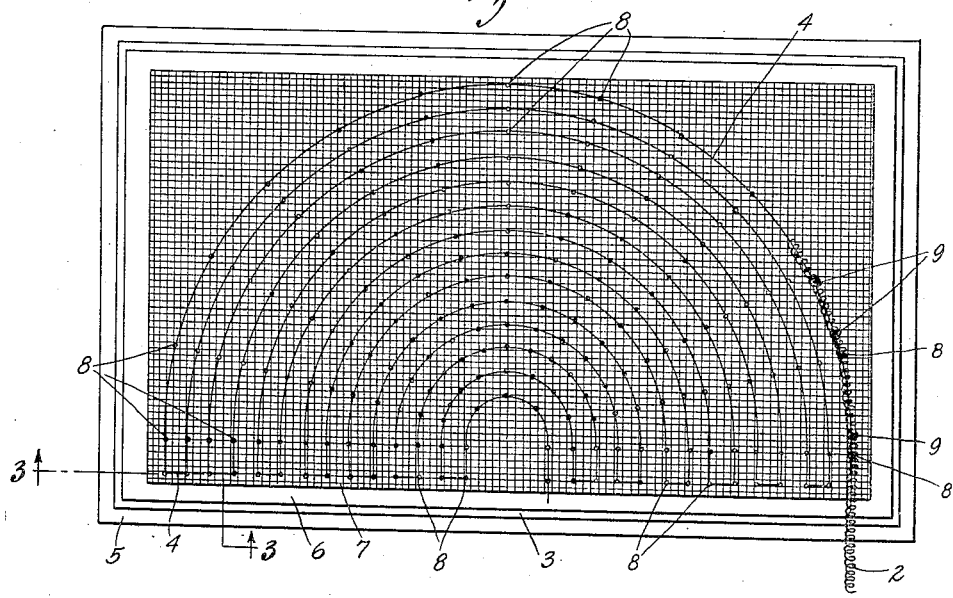
Figure 3:
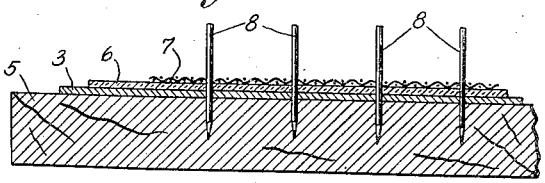

In the accompanying drawings, which form part of this specification and wherein like symbols refer to like parts wherever they occur, Fig. 1 is a top plan view showing the drawing mounted on the base member and the sheet of Cellophane laid over said drawing, Fig. 2 is a view similar to Fig. 1 showing the netting laid over the sheet of Cellophane, the positioning posts located along the wiring lines of the diagram and the coiled resistance wire bent along the wiring lines and interlocked with the positioning posts, Fig. 3 is an enlarged fragmentary vertical section on the line 3—3 in Fig. 2, Fig. 4 is a plan view showing the netting and resistance wire removed; and Figs. 5 and 6 are vertical cross sections showing the manner in which the netting and resistance wiring is incorporated in the die member during the molding thereof.

In the accompanying drawings, our invention is illustrated in connection with an electrically heated female die member A of molded or cast material. The invention, however, is equally applicable to electrically heated male die members. The die member A comprises a body of any desired shape having a suitable mold cavity 1 formed in the working face thereof. The die member is heated by means of an electric heating element B that is embodied therein close to the working surface of the mold cavity 1 and follows the contour thereof. Said heating element comprises a helically coiled resistance wire 2 which is wound or bent back and forth in a predetermined pattern or design which will uniformly heat and reinforce the die member A.

According to the present invention, a print or drawing 3 having a diagram 4 thereon showing the resistance wire layout desired for the heating element B is tacked, cemented or otherwise secured flatwise to the upper surface of a base or support 5 of plywood or other suitable material. The drawing 3 is covered with a sheet 6 of Cellophane or other transparent material through which the diagram may be observed and to which glue or cement does not readily adhere. The sheet 6 of Cellophane is then covered with a flexible openwork material 7, preferably a loosely woven fabric such as mosquito netting, through which the diagram 4 may be observed. Upright guide members or posts, preferably in the form of wire nails 8 that are driven through the netting 7, Cellophane and drawing 3 into the supporting board or base 5 along the wiring lines indicated on the diagram 4 which shows through said netting and Cellophane.

The helically coiled resistance wire 2 is then bent back and forth on the netting 7 along the wiring lines of the diagram 4 and temporarily held in line with said wiring lines by interlocking the helically coiled portions of said wire with the upright guide pins or posts 8 spaced apart along said lines. The resistance wire 2, after being thus bent or fashioned to form the pattern or design desired for the heating element B, is then secured or bonded to the netting 7 by quick drying adhesive, such as model airplane cement, drops 9 of such cement being applied to said resistance wire at spaced intervals throughout the length thereof.

The heating element B formed by the bent resistance wire 2, together with the netting backing 7 and preferably also the Cellophane sheet 6, are then stripped from the shaping device by lifting said element and netting off the guide posts 8 or by removing said posts from the supporting base 5. The sheet 6 of Cellophane, which serves to prevent the cement 9 from going through the netting 7 and bonding it to the drawing 3, is then stripped from the netting 7, leaving the heating element B mounted on said netting, which serves as a support or backing for holding the wire 2 in a pattern corresponding exactly to the wiring layout of the diagram 4 shown in the drawing 3.

The heating element B and backing 7 are then embodied as a unit in the die member A in the process of molding the same. During the process of molding the die A, the mold C therefor is partly filled with a suitable plastic molding material 10. The preassembled heating element A and openwork backing 7 are then lightly embedded in the soft material 10, after which the remainder of the molding or castable material is then immediately poured over said heating element and backing to complete the die member A.

The heating element B is located near the working surface or cavity 1 of the die A and follows the contour of said surface, the flexible backing 7 and the helically coiled wire 2 permitting said element to be bent to follow such contour. The netting or backing 7 serves to hold the resistance wire 2 in a predetermined pattern until the molded die A has hardened, after which said netting is consumed by the heat of the resistance wire and thus becomes charred and loses its strength. If desired, the netting 7 may be made of glass fibers or other non-combustible electric insulating material which will not be consumed by the heat of the heating element and will not reduce the efficiency thereof. The heating element is formed in the flat during the shaping thereof, but the helically coiled wire 2 and the backing 7 have sufficient flexibility to enable them to be bent to conform to surfaces having compound curvatures. However, if desired, the coiled resistance wire may be initially laid out on a curved surface corresponding to the working surface of the die member. The resistance wire may be bare or insulated, depending on whether the die is made of insulating or non-insulating plastic material; and said wire or wires may be bent or fashioned into a heating element having more than one circuit.

What we claim is:

1. The process of manufacturing molded die members having electric heating elements embodied therein which consists in applying to a support a diagram showing the resistance wire layout desired for the heating element, placing transparent material over said diagram, covering said transparent material with netting through which said diagram may be observed, positioning a resistance wire on said netting along said wiring line of said diagram, cementing to said netting the resistance wire thus positioned thereon, stripping from said transparent sheet said netting with said resistance wire cemented thereto, and then incorporating in the body of the die member during the process of molding the same said netting with said resistance wire cemented thereto.

2. The process of manufacturing molded die members having electric heating elements embodied therein which consists in applying to a support a diagram showing the resistance wire layout desired for the heating element, placing transparent material over said diagram, covering said transparent material with an openwork material through which said diagram may be observed, driving locating pins through said openwork material and said transparent material and into said support along the wiring lines of said diagram, positioning a helically coiled resistance wire on said openwork material along said wiring lines of said diagram and in interlocking engagement with said pins, cementing to said openwork material the resistance wire thus positioned thereon, stripping from said transparent material and said pins said openwork material with said resistance wire cemented thereto, and then incorporating in the body of the die member during the process of molding the same said openwork material with said resistance wire cemented thereto.

3. The process of manufacturing molded die members having electric heating elements embodied therein which consists in applying to a support a diagram showing the resistance wire layout desired for the heating element, placing transparent material over said diagram, covering said transparent material with a loosely woven fabric through which said diagram may be observed, driving locating pins through said fabric and said transparent material and into said support along the wiring lines of said diagram, positioning a helically coiled resistance wire on said fabric along said wiring lines of said diagram and in interlocking engagement with said pins, cementing to said fabric the resistance wire thus positioned thereon, stripping from said transparent material and said pins said fabric with said resistance wire cemented thereto, and then incorporating in the body of the die member during the process of molding the same said fabric with said resistance wire cemented thereto.

4. The process of manufacturing molded die members having electric heating elements embodied therein which consists in applying to a support a drawing showing the resistance wire layout desired for the heating element, placing transparent material over said drawing, covering said transparent material with a flexible netting through which said diagram may be observed, driving locating pins into said support through said netting, said transparent material and said drawing along the wiring lines of said drawing, positioning a helically coiled resistance wire upon said netting along said wiring line of said drawing and in interlocking engagement with said pins, cementing to said netting the resistance wire thus positioned thereon, stripping from said transparent sheet and said pins said netting with said resistance wire cemented thereto, and then incorporating in the body of the die member during the process of molding the same said netting with said resistance wire cemented thereto and with said netting and resistance wire bent to conform to the contour of the working surface of said die member.

5. The process of manufacturing molded die members having electric heating elements embodied therein which consists in applying to a support a diagram showing the resistance wire layout desired for the heating element, placing transparent material over said diagram, covering said transparent material with mosquito netting or the like, driving locating pins into said support through said netting and said transparent material, along the wiring lines of said diagram, positioning a helically coiled resistance wire on said netting along said wiring line of said diagram and in interlocking engagement with said pins, cementing to said netting the resistance wire thus positioned thereon, separating from said transparent sheet and said pins said netting with said resistance wire cemented thereto, pouring part of the die member and lightly embedding therein said netting with said resistance wire cemented thereto, and then pouring the remainder of said die member over said netting and the resistance wire cemented thereto.

CHARLES F. MARSCHNER.
EDWARD W. BRYAN.